Figure 1:
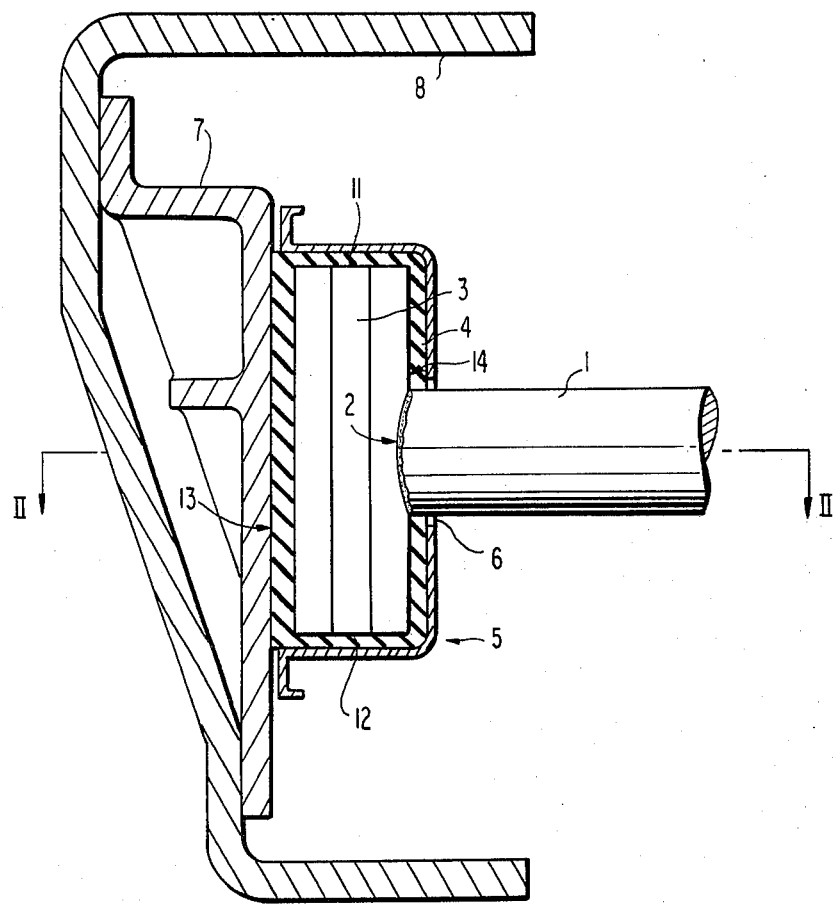

United States Patent [19]

Bruhnke et al.

[11] 4,421,351
[45] Dec. 20, 1983

[54] ARRANGEMENT FOR LIMITING BUMPER MOVEMENT

[75] Inventors: Ulrich Bruhnke, Ehningen; Roman Schöppel, Sindelfingen; Bernd Harloff, Böblingen, all of Fed. Rep. of Germany

[73] Assignee: Daimler-Benz Aktiengesellschaft, Stuttgart, Fed. Rep. of Germany

[21] Appl. No.: 313,505

[22] Filed: Oct. 21, 1981

[30] Foreign Application Priority Data

Oct. 21, 1980 [DE] Fed. Rep. of Germany ....... 3039674

[51] Int. Cl.³ .................. B60R 19/04; B60R 19/06
[52] U.S. Cl. ................................................. 293/132
[58] Field of Search ............... 293/132, 130, 102, 131

[56] References Cited
U.S. PATENT DOCUMENTS 3,888,531  6/1975  Straza et al. .................. 293/132
4,278,282  7/1981  Roubinet et al. ............... 293/132

FOREIGN PATENT DOCUMENTS 2347075  8/1980  Fed. Rep. of Germany .

Primary Examiner—Richard A. Bertsch
Attorney, Agent, or Firm—Craig & Burns

[57] ABSTRACT

A bumper arrangement which includes a support having an impact body or piece that is directly or indirectly arranged at a shock absorber mounting for a bumper of a motor vehicle. The impact piece is embedded or surrounded by an elastic bearing pad, with the bearing pad being surrounded by a housing connected with the bumper of the motor vehicle. The housing includes an opening for enabling a passage of a portion of the shock absorber mounting so as to permit a relative movement between the shock absorber and the housing. The impact body or piece includes areas of contact that are disposed opposite each other with one of the areas of contact facing the bumper and the other area of contact facing the shock absorber mounting. The areas of contact are fashioned so as to be convex or bowed outwardly. The bearing pad has a predetermined minimum thickness in an area adjacent to the housing of the top and bottom sides as well as the front and back sides of the impact piece which enables the bumper to only carry out rotating movements about a vertical axis of the motor vehicle.

11 Claims, 2 Drawing Figures

U.S. Patent   Dec. 20, 1983   4,421,351

ARRANGEMENT FOR LIMITING BUMPER MOVEMENT

The present invention refers to a bumper arrangement for motor vehicles and, more particularly, to an impact body or piece directly or indirectly arranged at a shock absorber mounting means for mounting a bumper at the motor vehicle, with the impact body being embedded by, for example, vulcanizing, in a bearing pad of an elastic material, and with the bearing pad being surrounded by a housing connected to the motor vehicle bumper, which housing has an opening through which portion of the shock absorber mounting means passes so as to permit relative movement of the shock absorber mounting means with respect to the housing.

In, for example, Auslegeschrift No. 23 47 075, a bumper arrangement is proposed wherein the vehicle bumper is supported so as to enable a possible motion on all sides. A disadvantage of this proposed arrangement resides in the fact that, since the bumpers may be of considerable weight and since the bumper contacts the bearing pad in an off-center relationship, i.e. off center relative to the center of gravity, there exists a possible danger that the bumper, after being mounted, may settle down, and, at the same time, tip toward a front of the motor vehicle. As can readily be appreciated, the settling down of the bumper and tilting forward not only impairs the overall appearance of the motor vehicle but, more significantly, may also impair, upon the occurrence of an impact, the necessary functioning of the elastic bearing pad so that a safe absorbing of impact loads on the bumper is not guaranteed.

A further disadvantage of the above proposed construction resides in the fact that it is possible for the bumper to be displaced so as to contact portions of the motor vehicle even when the impact is relatively small which, for obvious reasons, is something that must be avoided. This is potentially the case whenever an impact occurs which is not in direct axial alignment with the longitudinal axis of the shock absorber.

The aim underlying the present invention essentially resides in providing a bumper arrangement for a motor vehicle wherein a support is provided which enables a mounting of the motor vehicle bumper whereby, upon a corresponding impact on the bumper, only one shock absorber mounting means is necessarily brought in or retracted to absorb impact energy.

In accordance with advantageous features of the present invention, an impact body or piece is directly or indirectly contained at the respective shock absorber mounting means, with the impact body including opposed contact areas which respectively face the bumper and associated shock absorber mounting means. The opposed contact areas are convex or bowed outwardly, with the bearing pad, adjacent to the housing, in an area of the top and bottom side as well as a front and back side of the impact body having a minimum thickness so that the bumper can only execute rotating motions about a vertical axis of the vehicle.

Accordingly, it is an object of the present invention to provide a bumper arrangement support having an impact body or piece which avoids, by simple means, shortcomings and disadvantages encountered in the prior act.

Another object of the present invention resides in providing bumper arrangement support having an impact body or piece which enables support of the motor vehicle bumper in such a manner that vibrations which normally occur during a driving of the motor vehicle are minimized.

A further object of the present invention resides in providing a bumper arrangement with a support having an impact body or piece which reliably prevents a settling or tipping of the bumper.

A still further object of the present invention resides in providing a bumper arrangement support which is simple in construction and therefore relatively inexpensive to manufacture.

Yet another object of the present invention resides in providing a bumper arrangement support which ensures a proper shock absorbing functioning upon an occurrence of an impact on a bumper.

Figure 2:
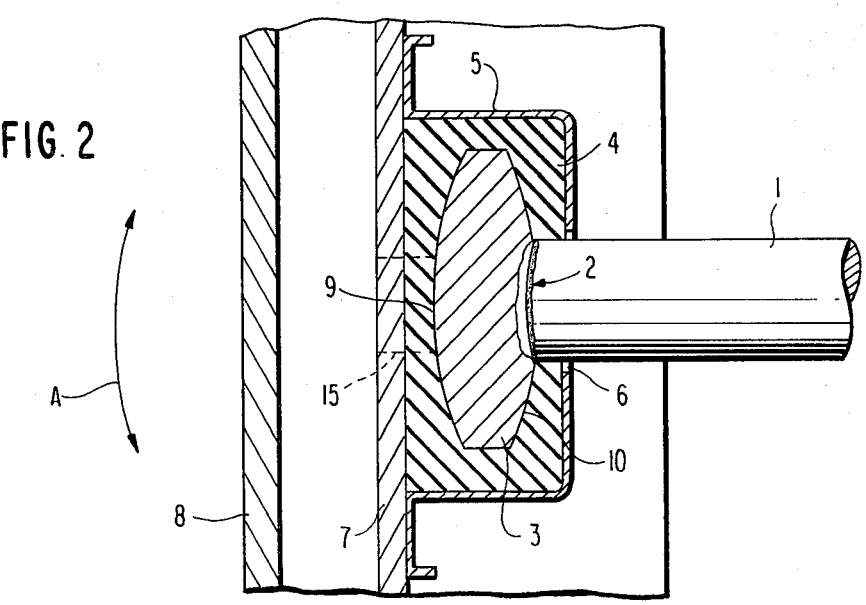

These and other objects, features, and advantages of the present invention will become more apparent from the following description when taken in connection with the accompanying drawing which shows, for the purposes of illustration only, one embodiment in accordance with the present invention, and wherein:

FIG. 1 is a cross sectional side view of a bumper, in an area of one support point, supported in accordance with the present invention; and FIG. 2 is a cross sectional view taken along the line II-II in FIG. 1.

Referring now to the drawing wherein like reference numerals are used in both views to designate like parts and, more particularly, to FIG. 1, wherein according to this figure, conventional shock absorbers 1, only one of which is shown in the drawing for clarity, are provided in each area of support for supporting a bumper 8 on a motor vehicle (not shown). The respective shock absorbers 1 provided in the support areas are secured or attached, in a conventional manner, to the motor vehicle at, for example, a vehicle cross bearer or frame member (not shown). It being understood that there are at least two shock absorbers for each bumper 8 with at least one shock absorber associated with each end of the bumper. A free end generally designated by the reference numeral 2 of the shock absorber 1 has mounted thereon an impact piece 3 surrounded by bearing pad 4 formed of an elastic material. A housing generally designated by the reference numeral 5 encloses the bearing pad 4 and is detachably attached to a receiving or mounting plate 7 fastened to the bumper 8. The housing 5 is provided with an opening 6, with the shock absorber 1 extending through the opening 6 with a clearance.

The impact body or piece 3 includes, as shown most clearly in FIG. 2, an area of contact 9 facing the bumper and an area of contact 10 facing the shock absorber 1. As best seen in FIG. 1, in order to avoid settling and tipping motions of the bumper 8, the thickness of the bearing pad 4 in the area where the impact piece 3 is closest to the housing 5, i.e. a top side portion 11 and bottom side portion 12 as well as a front side portion generally designated by the reference numeral 13 and a rear side portion generally designated by the reference numeral 14, is limited to a minimum thickness. The minimum thickness mainly depends upon a hardness of the elastic material used and, may in certain limiting situations, be equal to zero. Sagging or movement of the bumber about a horizontal axis clearly being inhibited due to the mechanical interference of the impact piece 3 with the housing 5.

By virtue of the constructional features of the impact body or piece 3 described hereinabove, along with an interaction of the bearing pad 4, the impact body or piece 3 can function as a "roll-off body" or pivot member so that when an impact is applied to the bumper 8 in an off center relationship, a rotational motion of the bumper 8 takes place about a vertical axis of the vehicle as shown by the double arrow A in FIG. 2. The advantage clearly being that the shock absorber nearest the impact may, accordingly, function in the manner in which it is intended and a shock absorber associated with the other end of the bumper need not respond. This is due to the bumper, at this time, being permitted to pivot in a limited manner relative to the ends of the shock absorbers due to the configuration of the impact pieces and the fact that they are imbedded in resilient bearing pads.

While the illustrated embodiment depicts the bearing pad 4 as being fashioned in one piece, it is also possible to use a bearing pad 4 that is composed of several individual pieces, wherein the individual pieces may have differing hardnesses so that it is possible to coordinate the respective pieces and determine the impact characteristics of the so constructed bearing pad. Likewise, while a welded joint is illustrated in the drawings as being provided between the shock absorber 1 and the impact body or piece 3, it is also possible to fasten both parts by means of, for example, a threadable element (not shown) and, for this purpose, the receiving plate 7 and bearing pad 4 must be provided with a suitable opening 15 (FIG. 2) for enabling a fastening of the threadable element to the shock absorber 1.

In, for example, situations wherein the bumper is made of an extruded material or plastics, it is also possible in accordance with the present invention to shape the bumper to include a housing that receives or accommodates the bearing pad 4 while the illustrated embodiment depicts the central longitudinal axis of the shock absorber 1 and central longitudinal axis of the impact piece or body 3 to extend at right angles to each other, depending upon the bumper arrangement, such a right angular relationship is not absolutely necessary.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We Claim:

1. A bumper arrangement for supporting a bumper on a motor vehicle, the arrangement including an impact body, an elastic bearing means surrounding the impact body, and further means for enabling a mounting of the impact body and bearing means on the motor vehicle, characterized in that the impact body includes a first contact area facing the bumper, a second contact area facing the further means, the first and second contact areas are disposed opposite to one another and are formed as convex surfaces, the bearing means includes a top side, a bottom side, a front side facing the bumper, and a back side facing the further means, and in that portions of the top side, bottom side, front side, and back side, have a predetermined minimum thickness so as to enable the bumper to only carry out rotatable movements about an axis extending vertically relative to the motor vehicle.

2. A bumper arrangement according to claim 1, characterized in that the impact body is directly connected to the further means.

3. A bumper arrangement according to claim 1, characterized in that means are provided for indirectly connecting the impact body to the further means.

4. A bumper arrangement according to one of claims 1, 2 or 3, characterized in that the further means includes a shock absorber means adapted to be mounted to the vehicle in bumper support areas thereof, a housing means adapted to be connected to the bumper is provided for accommodating the bearing means, and in that an opening is provided in the housing means for accommodating a portion of the shock absorber means with a clearance so as to enable a relative movement between the housing means and the shock absorber means.

5. A bumper arrangement according to claim 4, characterized in that the impact body is vulcanized in the elastic bearing means.

6. A bumper support arrangement for supporting a motor vehicle bumper of the type generally supported relative to the vehicle by a plurality of shock absorbing means, comprising an impact body associated with each shock absorbing means of the plurality of shock absorbing means, wherein each impact body includes a first contact area facing the bumper and a second contact area facing the vehicle, the first contact area and second contact area are disposed opposite to one another and are formed as generally convex surfaces, elastic bearing means substantially surrounding each impact body, housing means associated with the bumper for confining and cooperating with a respective impact body and elastic bearing means, wherein an impact on the bumper occurring off center will actuate a shock absorbing means closest to the impact and the bumper will be allowed to pivot relative to the impact body about an axis extending generally vertical relative to the vehicle.

7. A bumper support arrangement as set forth in claim 6, wherein the bearing means includes a top side, a bottom side, a front side facing the bumper, and a back side facing toward the vehicle, and wherein portions of the top side, bottom side, front side, and back side have a minimized predetermined thickness to thereby limit rotative movement of the bumper relative to an axis extending vertical relative to the vehicle.

8. A bumper support arrangement as set forth in claim 6, wherein each impact body is directly connected to a respective shock absorbing means.

9. A bumper support arrangement as set forth in claim 6, wherein each housing means is secured to the back side of the bumper and includes an opening through which a respective shock absorbing means extends.

10. A bumper support arrangement as set forth in claim 7, wherein each impact body is vulcanized in a respective elastic bearing means.

11. A bumper support arrangement as set forth in claim 6, wherein each impact body is a discrete element fixedly securable to a respective shock absorbing means.

* * * * *